United States Patent [19]

Lee

[11] Patent Number: 5,442,394
[45] Date of Patent: Aug. 15, 1995

[54] METHOD FOR IMPROVING THE RESOLUTION OF THREE CCD CAMERA AND APPARATUS THEREOF

[75] Inventor: Hyo S. Lee, Suweon, Rep. of Korea

[73] Assignee: Samsung Electronics Co., Ltd., Kyungki-do, Rep. of Korea

[21] Appl. No.: 160,328

[22] Filed: Dec. 1, 1993

Related U.S. Application Data

[63] Continuation of Ser. No. 840,971, Feb. 26, 1992, abandoned.

[30] Foreign Application Priority Data

Feb. 26, 1991 [KR] Rep. of Korea ............... 91-3147

[51] Int. Cl.$^6$ .............................................. H04N 9/07
[52] U.S. Cl. ...................... 348/264; 348/265; 348/305
[58] Field of Search ............... 348/262, 264, 265, 305, 348/234; H04N 3/15, 3/14, 9/04, 9/07, 9/09, 9/097

[56] References Cited

U.S. PATENT DOCUMENTS

| | | | |
|---|---|---|---|
| 3,975,760 | 8/1976 | Yamanaka et al. | 358/41 |
| 4,071,853 | 1/1978 | Yamanaka | 358/41 |
| 4,106,056 | 8/1978 | Nagumo et al. | 358/50 |
| 4,183,052 | 1/1980 | Yamanaka et al. | 358/50 |
| 4,249,203 | 2/1981 | Yamanaka | 358/50 |
| 5,049,998 | 9/1991 | Lee | 358/213.17 |
| 5,157,481 | 10/1992 | Kashimura et al. | 358/51 |

FOREIGN PATENT DOCUMENTS

| | | | |
|---|---|---|---|
| 279647 | 8/1988 | European Pat. Off. | H04N 9/04 |
| 58-59690 | 4/1983 | Japan | H04N 9/04 |

*Primary Examiner*—Michael T. Razavi
*Assistant Examiner*—Tuan V. Ho
*Attorney, Agent, or Firm*—Sughrue, Mion, Zinn, Macpeak & Seas

[57] ABSTRACT

An apparatus for interpolating pixels using correlated dual sample-hold processing for detecting and removing dark current occurring during the feed through period to thereby improve the resolution of a 3-panel type video camera includes first and second composite delay elements for selectively delaying respective ones of signals corresponding to R, G and B channels to permit selected delay of a pair of the signals by ½ pitch delays of ⅓ pitch delays during interlacing for interpolating pixels. A method for signal processing using selected pitch delay values is also disclosed.

4 Claims, 6 Drawing Sheets

METHOD FOR IMPROVING THE RESOLUTION OF THREE CCD CAMERA AND APPARATUS THEREOF

This is a Continuation of Application No. 07/840,971 filed Feb. 26, 1992, now abandoned.

FIELD OF THE INVENTION

The present invention relates to an interfacing method for interpolating pixels using a sample-hold technique and an apparatus therefor, and more particularly to, the method and apparatus in which black noise or dark current occurring in the feed through period is detected and removed and interpolating pixels are shifted by selectively delaying R(Red), G(Green, B(Blue) photo signals by $\frac{1}{2}$ or $\frac{1}{3}$ pitch using sample and hold processing in a 3-panel type video camera, thereby improving the resolution considerably.

BACKGROUND OF THE INVENTION

Generally, during interlacing for interpolating pixels to improve the resolution of a three element CCD camera, a R channel CCD (charge coupled device) and B channel CCD are constructed with a spatial difference in a video camera provided with CCDs respectively for red, green and blue color. The conventional method and apparatus for and interlacement of the interpolating pixels are as shown in FIGS. 1 and 2.

Figure 1:
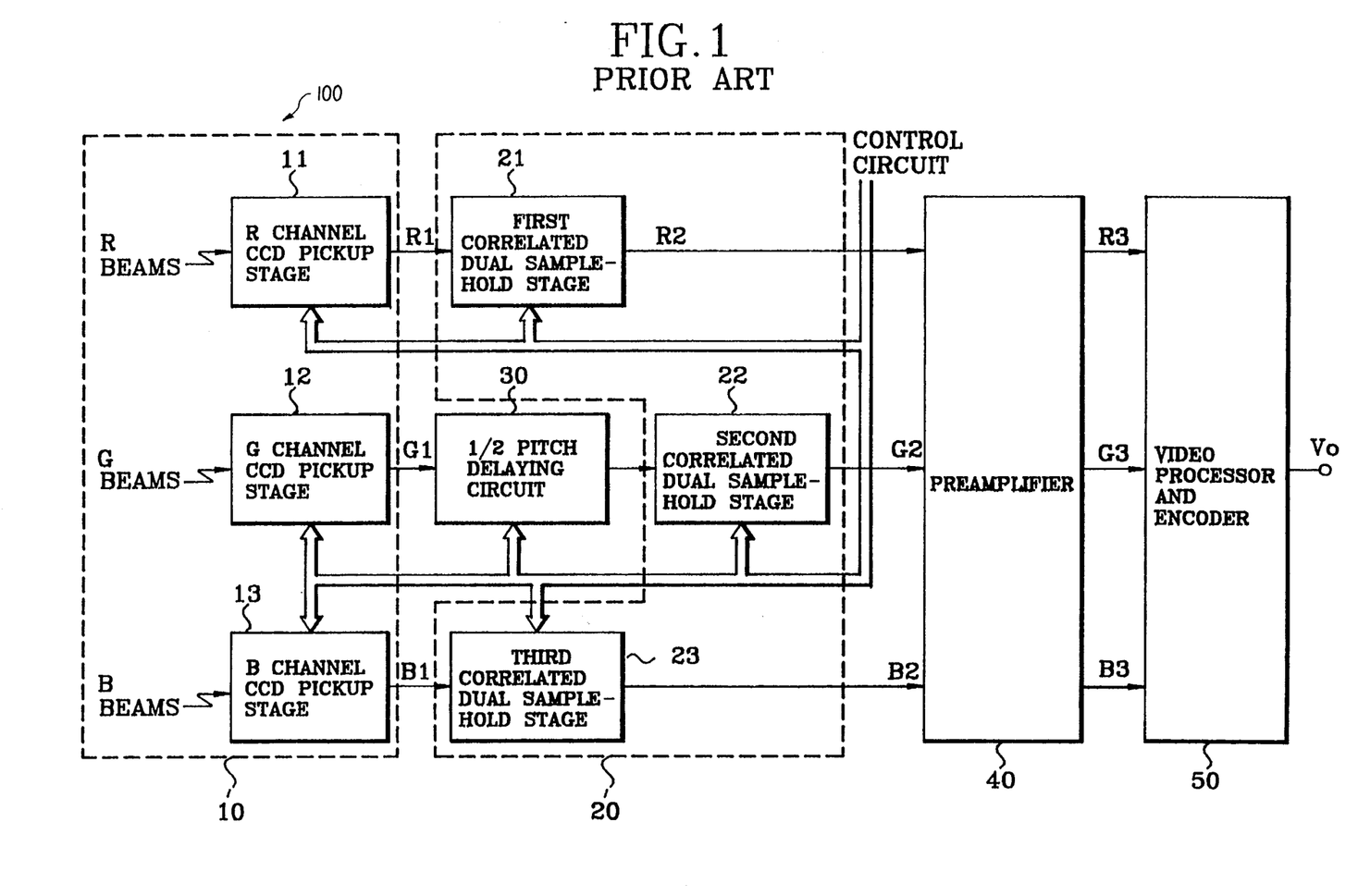
FIG. 1 is a block diagram showing the conventional ½-pitch interlacing apparatus for interpolating pixels.
Figure 2A:
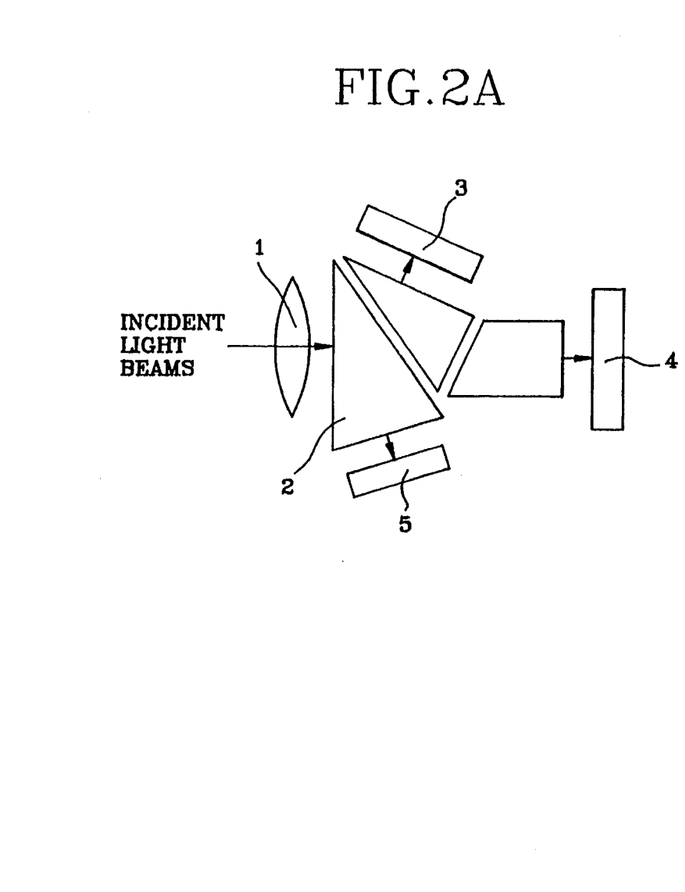
In FIG. 2A, a photoelectrical converting device is illustrated serving as CCD signal pickup element.
Figure 2B:
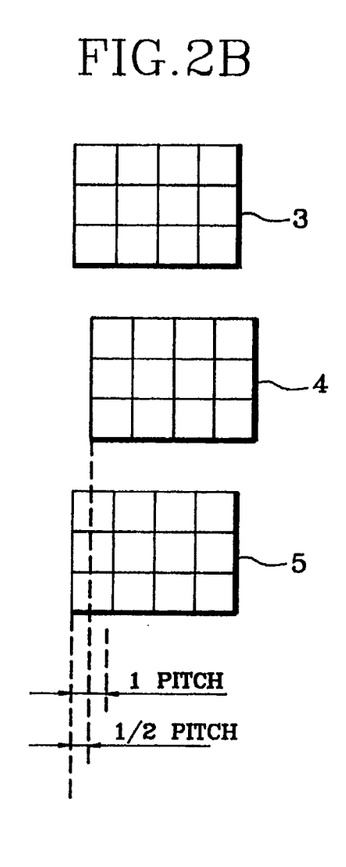
in FIG. 2B, an example of a 12 pixel CCD element is illustrated in which G Channel CD 4 is delayed by ½ pitch in a horizontal direction; and in FIG. 2C, the synthesis of R, G and B signals is illustrated.
Figure 2C:
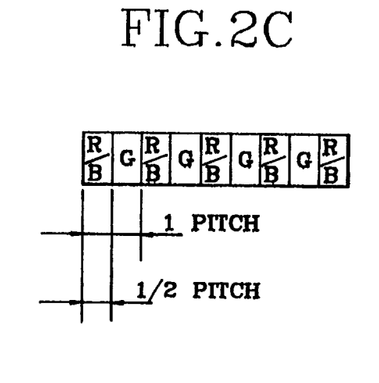

As shown in FIG. 2A, R beams among the input beams through a lens 1 and a prism 2 pass through an R channel CCD 3, and then, are converted to electrical signals at an R channel CCD signal pickup stage 11 of a CCD pickup circuit 10 of FIG. 1, and are output. Signal R1 is applied to a pre-amplifier 40 after passing through a first correlated dual sample-hold stage 21 of a correlated dual sample-hold circuit 20, which detects and removes dark current occurring during the feed through period.

Meanwhile, G beams are converted to electrical signals at a G channel CCD signal pickup stage 12, and then, the signals are delayed by $\frac{1}{2}$ pitch by a $\frac{1}{2}$-pitch delaying circuit 30 using sample-hold processing. Then, the signals are applied to a second correlated dual sample-hold stage 22, and then, noises are removed from the signals by the stage 22, before such formed signals G2 are applied to the pre-amplifier 40.

Meanwhile, B beams are converted to electrical signals at a B channel CCD signal pickup stage 13, and the signals thus formed pass through a third correlated dual sample-hold stage 23. During the passage, dark current is removed from the signals to form signals B2, and then, the signals B2 are applied into the pre-amplifier 40.

The signals R2, G2 and B2 applied to the pre-amplifier 40 are fed to pass low pass filters and subjected to gain amplifications. Then, the signals pass through a video processor and encoder circuit 50 before being provided in the form of composite video signals Vo, where the G signals G1 perform a function as shown in FIG. 2 in the $\frac{1}{2}$-pitch delaying circuit 30.

FIG. 2B shows an example of a 12 pixel CCD element, in which G channel CCD 4 is delayed by $\frac{1}{2}$ pitch in the horizontal direction. If the signals R2, G2 and B2, in which the G side is delayed, are mixed together, they constitute a signal arrangement as shown in FIG. 2C.

Thus, when the pixels being interpolated are interlaced by $\frac{1}{2}$ pitch, the sample and hold response Rf is as follows.

$$3Rf3 = \frac{\sin e \, x}{x} M(j\omega) \quad (1)$$

where $\chi$ represents a delayed angle, and $M(j\omega)$ represents a phase of a complex number seen during the sample and hold processing.

If the Formula (1) is applied to a $\frac{1}{2}$-pitch interlacing method, the following formula is obtained.

$$Rf = \frac{\sin\left(\frac{fo}{fc} \cdot \pi \cdot \frac{\Delta T}{Tc}\right)}{\frac{fo}{fc} \cdot \pi \cdot \frac{\Delta T}{Tc}} \quad (2)$$

In the above formula, fc is a Nyquist Frequency which is obtained by carrying out sampling at a frequency over twice the maximum frequency of the base band signals to be samples. The frequency fc will be termed sampling frequency below. Frequency is a maximum frequency of the base band signals and has a relationship with fc in which fo=fc/2. Further, $\Delta T$ is a holding time, and Tc is the period of one clock cycle, that is, 1/fc. If the above variables are substituted into Formula (2), the following formula is obtained.

$$Rf = \frac{\sin\left(\frac{1}{2} \cdot \pi \cdot \frac{1}{2}\right)}{\frac{1}{2} \cdot \pi \cdot \frac{1}{2}} = \frac{\sin(\pi/4)}{\pi/4} \quad (3)$$

That is, $\sin \pi/4 = \sin 45° = \frac{1}{2}$, and therefore its resolution $m_1$ is defined as follows.

$$m_1 = m \cdot \frac{1}{\sin 45°} = 2 \cdot m \quad (4)$$

In the above formula, m represents the resolution in the case where the $\frac{1}{2}$-pitch interlacing method is not employed. The resolution $m_1$ is increased by 2 times at the maximum as shown in Formula 4 in the case where the $\frac{1}{2}$-pitch interlacing method is employed.

Figure 6:
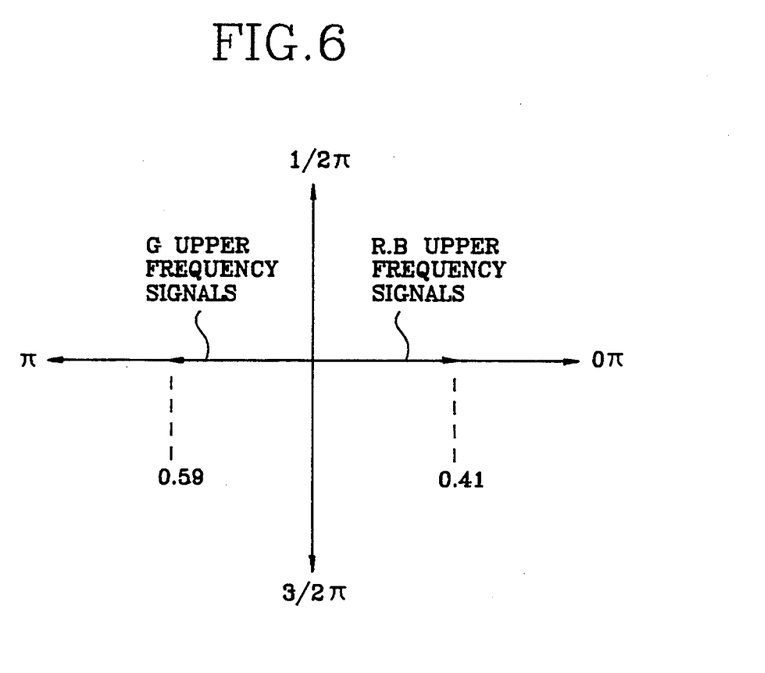
FIG. 6 is a vector expression of the upper frequency signals in the ½-pitch interlacement method.

Meanwhile, the magnitude of the upper frequency signals, which appears upon performing the sampling, is as shown in FIG. 6. As is well known, luminance signals Y can be expressed as follows.

$$Y = 0.3R + 0.59G + 0.11B \quad (5)$$

Therefore, the following values can be obtained, because the G channel is delayed by $\frac{1}{2}$ pitch as compared with the R and G channels. That is, $Y_{R.B} = 0.41 = 0.3 + 0.11$. $Y_G = 0.59$. Therefore, the upper frequency signal components can be expressed as shown in FIG. 6, and it can not be removed completely in the vector product generated by the values of $Y_{R.B}$ and $Y_G$.

SUMMARY OF THE INVENTION

The present invention provides an apparatus and a method for interlacing for interpolating pixels using sample-hold processing, in which the resolution is improved and the upper frequency signals are completely eliminated by using the above method of interlacing for interpolating the pixels.

The method of the present invention comprises the steps of converting R, G and B photo signals to electrical signals, delaying any one pair of the R, G and B signals by $\frac{1}{2}$ pitch and removing dark current from the R, G and B signals by using correlated dual sample-hold processing, and synthesizing the R, G and B signals in order to form composite video signals.

In carrying out the delaying step, a selected one of the ⅓-pitch interlacing and the ½-pitch interlacing is selected in accordance with the levels of the frequency.

The apparatus of the present invention comprises a CCD pickup circuits provided with a CCD signal pickup stage for each of the respective R, G and B channels and for converting the R, G and B photo signals to electrical signals, a correlated dual sample-hold circuit provided with first to third correlated dual sample-hold stages for the respective R, G and B channels and for removing dark current from the output signals of the CCD pickup circuit, a pre-amplifier for low-pass-filtering the output from the dual sample-hold circuit and amplifying gains, and a video processor and encoder for video processing by synthesizing the R, G and B outputs from the pre-amplifier in order to form composite video signals.

The apparatus of the present invention further comprises composite ⅔-pitch and ½-pitch delaying circuit for delaying the output signals from the G channel CCD signal pickup stage by a selected one of ⅔-pitch and ½-pitch to provide them to the second correlated dual sample-hold stage, composite ⅓-pitch delaying and by-passing circuit for a selected one of delaying the B signals of the B channel CCD pickup stage by ⅓-pitch and for directly bypassing them to provide them to the third correlated dual sample-hold stage, and a control signal converting circuit provided with output clock signals from a pulse generator for generating control signals in a camera, and provided with the R, G and B synthesized video signals from the pre-amplifier for controlling the respective circuits so as to select a suitable interlacing for interpolating the pixels.

BRIEF DESCRIPTION OF THE DRAWINGS

The above object and other advantages of the present invention will become more apparent by describing in detail the preferred embodiment of the present invention with reference to the attached drawings, in which:

FIGS. 2A–2E illustrate the ½-pitch interlacing method for interpolating pixels according to the block diagram of FIG. 1.

FIGS. 4A–4B include illustrations for explaining the ⅓-pitch interlacing method.

DETAILED DESCRIPTION OF THE PREFERRED EMBODIMENT

Figure 3:
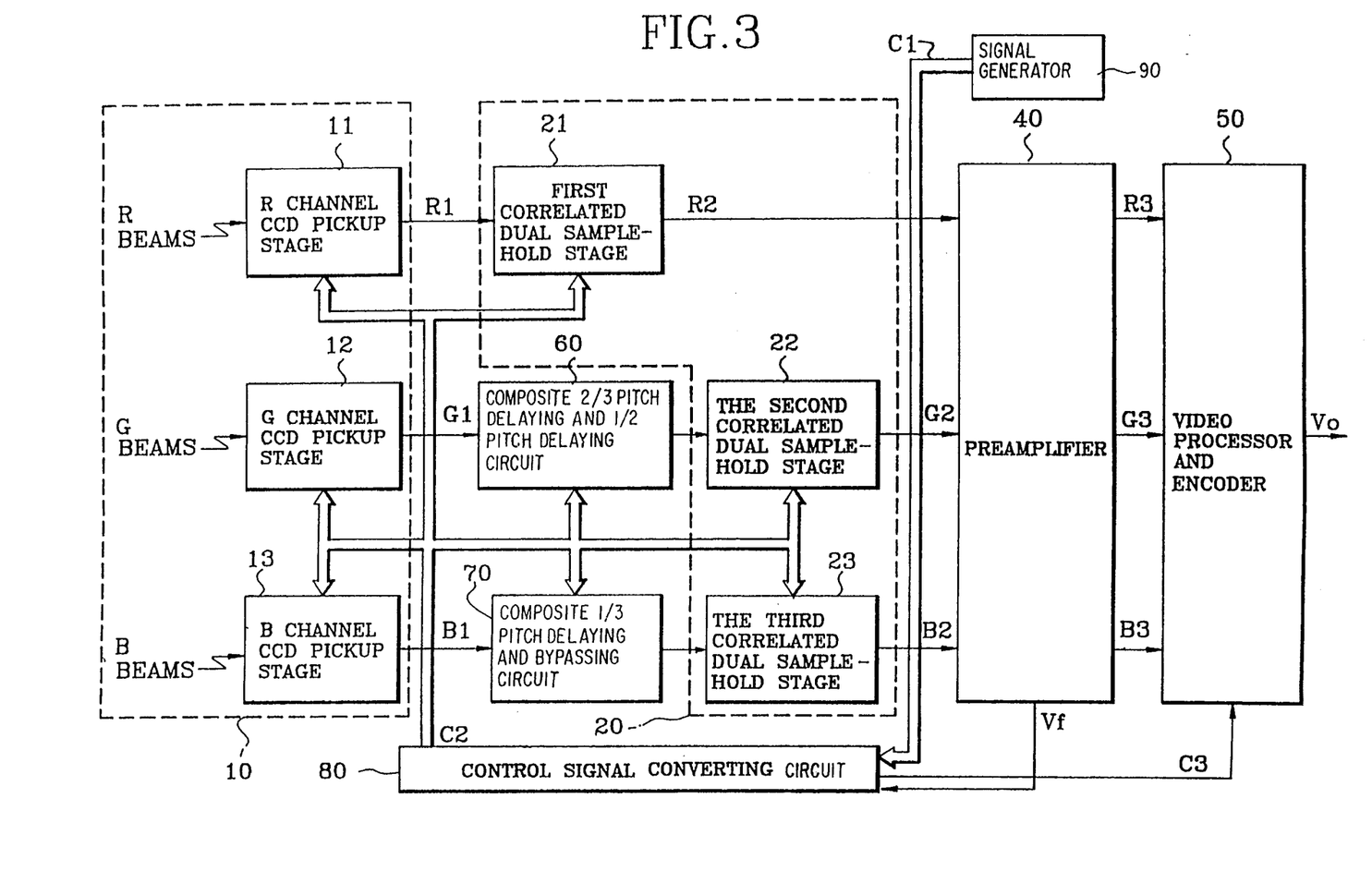
FIG. 3 is a block diagram showing the interlacing apparatus for interpolating pixels according to the present invention.

FIG. 3 is a block diagram showing the constitution of the interlacing apparatus for interpolating pixels according to the present invention. As shown in FIG. 3, a CCD pickup circuit 10 which receives R, G and B photo signals and converts them to electrical signals includes an R channel CCD pickup stage 11 for converting the R beams to electrical signals, a G channel CCD pickup stage 12 for converting the G beams to electrical signals, and a B channel CCD pickup stage 13 for converting the B beams to electrical signals, so as to output R, G and B signals R1, G1 and B1.

The output from the CCD pickup circuit 10 is provided to a correlated dual sample-hold circuit 20 so that the output signals R1 from the R channel CCD pickup stage 11 are provided to a first correlated dual sample-hold stage 21 and the output signals G1 from the G channel CCD pickup stage 12 are supplied through a composite ⅔-pitch delaying and ½-pitch delaying circuit 60 to a second correlated dual sample-hold stage 22, and the output signals B1 from the B channel CCD pickup stage 13 are supplied through a composite ⅓-pitch delaying and bypassing circuit 70 to a third correlated dual sample-hold stage 23.

Output signals R2, G2 and B2 from the correlated dual sample-hold circuit 20 are supplied to a pre-amplifier 40, and output signals R3, G3 and B3 from the pre-amplifier 40 are supplied to a video processor and encoder 50.

A control signal converting circuit 70 receives clock signals from a pulse generator 90 in a camera, 100 and also receives R, G and B synthesized video signals Vf from the pre-amplifier 40 to supply control signals C2 through bus lines to the above circuits, respectively.

In the present invention constructed as described above, it is well-known that the CCD pickup circuit 10 converts the R, G and B beams to electrical signals to generate output signals R1, G1 and B1. The correlated dual sample-hold circuit 20 removes the dark current from the output signals from the CCD pickup circuit 10.

The composite ⅔-pitch delaying and ½-pitch delaying circuit 60 delays the output signals G1 from the G channel CCD pickup stage 12 by either ⅔ pitch or by ½ pitch in accordance with the control signals C2 of the control signal converting circuit 80, where delaying by ½ pitch is performed in the case where a ½-pitch interlacing method is desired and delaying by ⅔ pitch is performed in the case where a ⅓-pitch interlacement method is desired.

Therefore, according to the ½-pitch interlacing method, the second correlated dual sample-hold stage 22 receives channel signals delayed by ⅔ pitch and according to the ½-pitch interlacing method, the sample-hold receives channel signals delayed by ½ pitch.

The composite ⅓-pitch delaying and bypassing circuit 70 delays by ⅓ pitch the output signals B1 from the B channel CCD pickup stage 13 under the control according to the control signals C2 of the control signal converting circuit 80 in the case of ⅓-pitch interlacement method is desired, or bypasses the signals B1 to the third correlated dual sample-hold stage 23 in any other cases than the case where the ⅓-pitch interlacement shifting method is desired.

The correlated dual sample-hold circuit 20 receives the above described signals and removes the dark current from the signals before providing them to the pre-amplifier 40.

The pre-amplifier 40 filters the fine output signals, e.g., several hundred mV, from the correlated dual sample-hold circuit 20 and amplifies gains to a great degree before providing them to the video processor and encoder 50.

The video processor and encoder 50 processes the respective output signals R3, G3 and B3 and outputs composite video signals Vo. The control signal converting circuit 80 receives clock signals C1 and video signals Vf respectively from the pulse generator 90 of the video camera and the pre-amplifier 40 to select between the ⅓-pitch interlacing method and the ½-pitch interlacing method. Furthermore, the control signal converting circuit 80 controls the CCD signal pickup circuit 10, the correlated dual sample-hold circuit 20, the composite ⅔-pitch delaying and ⅓-pitch delaying circuit 60, and the composite ⅓-pitch delaying and bypassing circuit 70.

Now, the ⅓-pitch interlacing method will be described referring to FIG. 4.

Figure 4A:
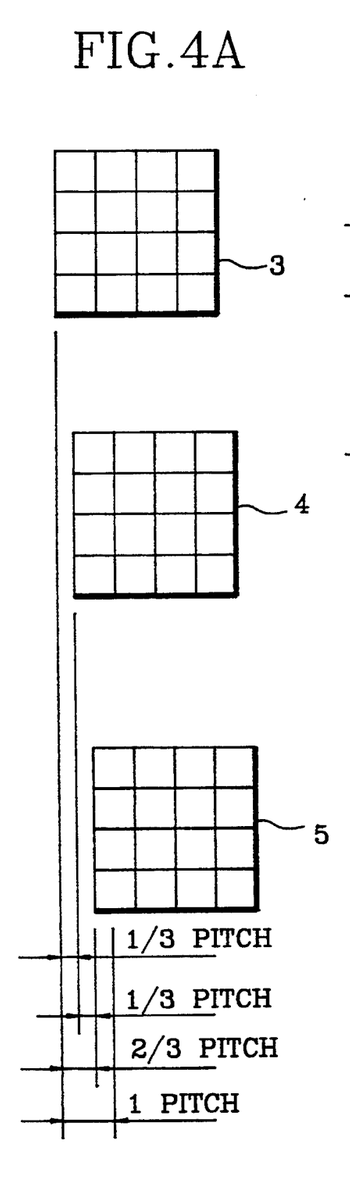
In FIG. 4A, an example of CCD is illustrated; and in FIG. 4B, the synthesis of R, G and B signals is illustrated.

As shown in FIG. 4A, the pixels of the G channel CCD 4 are delayed by ⅓ pitch as compared with the pixels of the R channel CCD 3, and the pixels of the B channel CCD 5 are delayed by ⅓ pitch compared with the pixels of the G channel CCD 4.

Consequently, the pixels of the B channel CCD 5 are delayed by ⅔ as compared with the pixels of the R channel CCD 3.

Figure 4B:
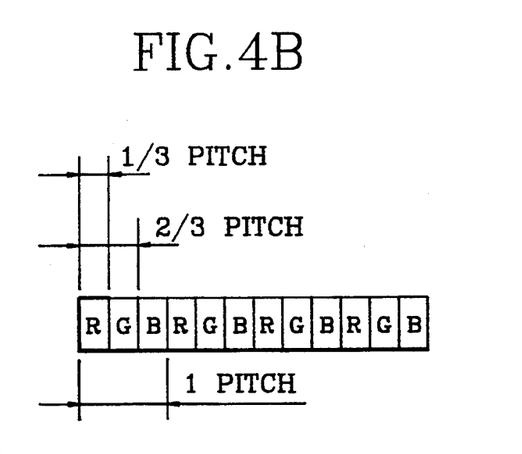

The synthesis of the signals delayed by ⅓ pitch can be expressed by the synthesized signal pattern of FIG. 4B, in which the R, G and B signals are respectively formed of ⅓ pitch, thereby increasing the number of pixels by three times.

Meanwhile, if the variables of the ⅓-pitch interlacement method are substituted into Formula 2 employing the ½-pitch interlacement method, then the following formula can be obtained.

$$Rf = \frac{\operatorname{Sin}\left(\frac{fo}{fc} \cdot \pi \cdot \frac{\Delta T}{Tc}\right)}{\frac{fo}{fc} \cdot \pi \cdot \frac{\Delta T}{Tc}}$$

$$= \frac{\operatorname{Sin}\left(\frac{1}{2} \cdot \frac{1}{3} \cdot \pi\right)}{\frac{1}{2} \cdot \frac{1}{3} \cdot \pi} = \frac{\operatorname{Sin}(\pi/6)}{\pi/6}$$

Where the pixel is shifted spatially by $\sin 30° = \frac{1}{2}$ and the increased resolution $m_2$ can be defined as follows:

$$m_2 = m \cdot \frac{1}{\operatorname{Sin} 30°} = 2m$$

Thus, the resolution is improved by 1.4 times, at a maximum, more than that of the conventional ½-pitch interlacement method.

Meanwhile, in Formula 5, because the synthesizing proportions, for respective R, G and B signals are different, the luminance signal Y must become as follows:

$$Y = 0.33R + 0.33G + 0.33B \quad (6)$$

However, since the standard for the luminance signals is defined by Formula 5, there is a problem in handling the various signals according to Formula 6.

In order to resolve this problem, the composite ⅓-pitch delaying and bypassing circuit 70 and the composite ⅔ pitch delaying and ⅓-pitch delaying circuit 60, as shown in FIG. 3, are employed to serve as a bypassing circuit and a ½-pitch delaying circuit respectively, and the ⅓ pitch delay is converted to a ½ pitch delay.

That is, the control signal converting circuit 80, which receives clock signals C1, generates control signals C2 after being provided with video signals Vf from the pre-amplifier 40, so that the above circuits advantageously serves as the ½-pitch delaying circuit, and the bypassing circuit respectively, in the case of low band signals, thereby allowing handling of the luminance signal Y according to the Formula 5.

Meanwhile, in the case of high band signals, the composite ⅔-pitch delaying and serves as a ⅔-pitch delaying circuit and the composite ⅓-pitch delaying and bypassing circuit 70 serves as a ⅓-pitch delaying circuit, so as to switch over to a ⅓-pitch interlacing method, thereby making it possible to treat the high band signals.

In the general color resolution of composite video signals, side I has 180 TV lines less than 2 MHz, and side Q has 40 TV lines less then 0.5 MHz. Therefore, for a high band signal having several hundred TV lines, it is not necessary to satisfy the Formula 5.

If any one of the R, G and B signals is significantly different from the others, this means that there exists a color so that the control signals C2 is operated to satisfy Formula 5.

Figure 7:
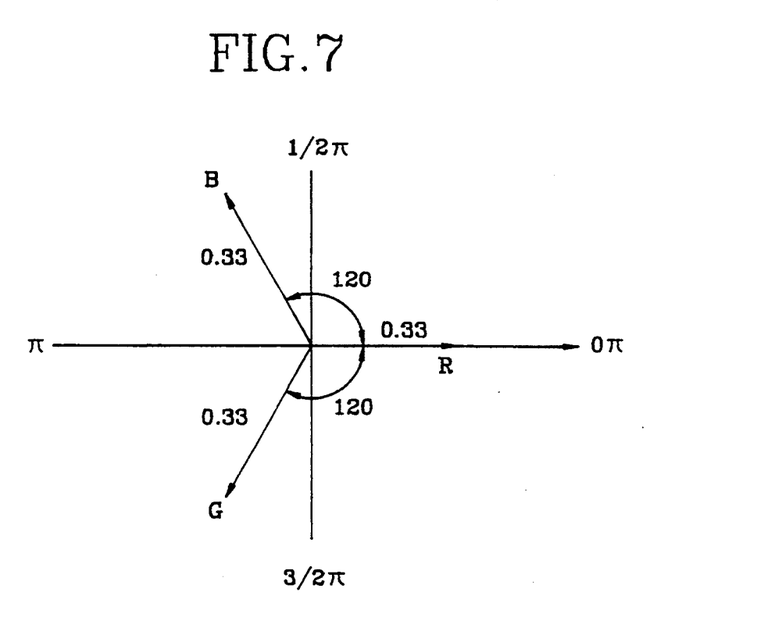
FIG. 7 is a vector expression of the upper frequency signals in the ⅓-pitch interlacement method.

Moreover, the upper frequency signals in the case of ⅓ pitch delaying method can be completely eliminated in the vector product, as shown in FIG. 7, and therefore, better characteristics can be obtained compared with the case of ½ pitch delaying method.

Figure 5:
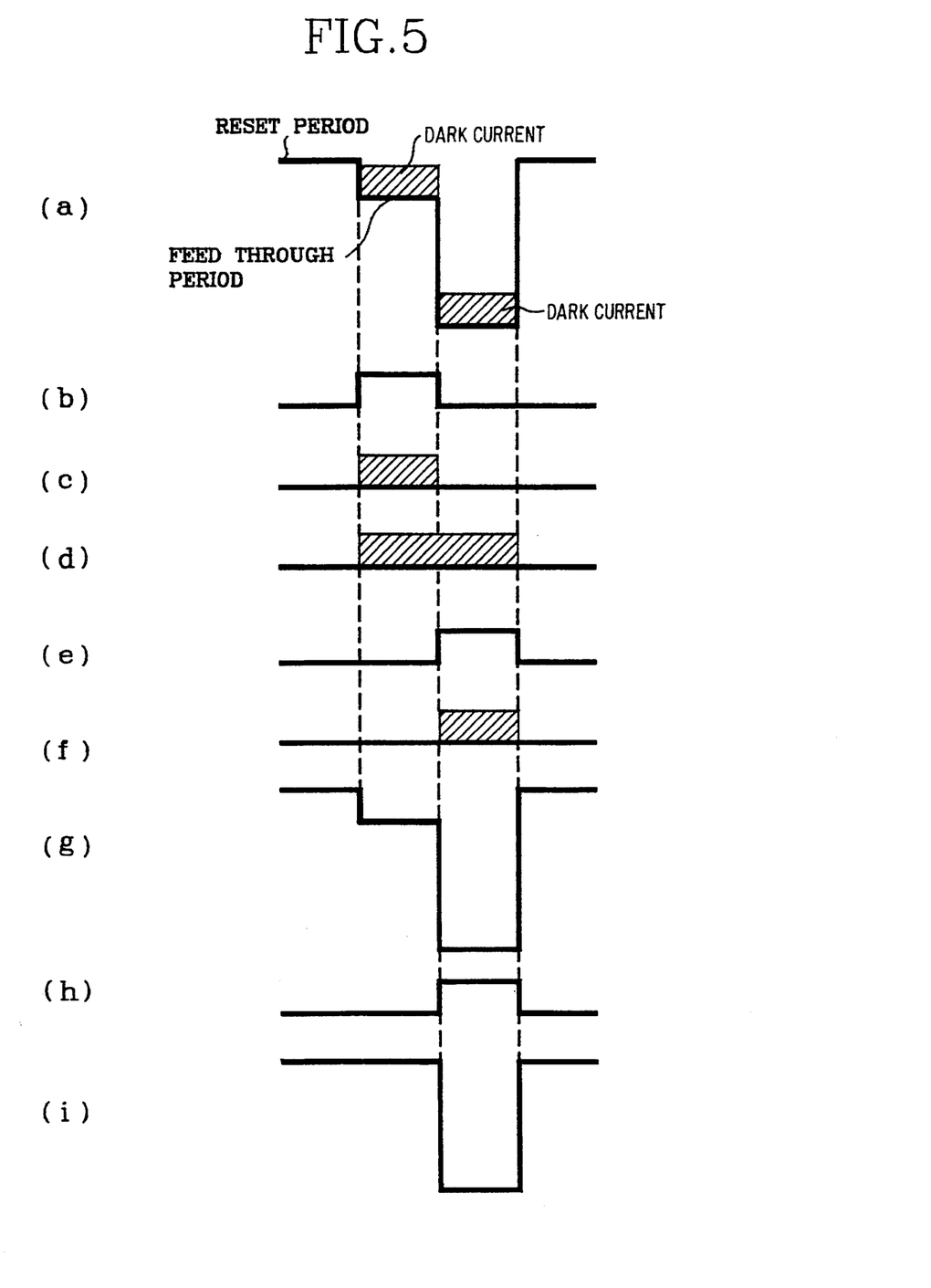
FIG. 5 illustrates the wave pattern for the respective parts as shown in FIG. 3.

FIG. 5 illustrates the operating wave patterns which represent the procedures for removing the dark current by the correlated sample-hold circuit 20. The wave pattern (a) is a signal wave pattern of a pixel of a CCD containing dark current. The dark current is extracted during a feed-through period, as shown by the wave pattern (c). Then the dark current is held up as shown by the wave pattern (d), which are then, sampled as shown by the wave patterns (e) and (f) in order to remove the dark current. After completely removing the dark current as shown by the wave pattern (g), the signals are samples as shown by the wave pattern (h), and then, the desired signal components of the wave pattern (i) are provided.

Thus, the output signals from the CCDs of the R, G and B channels are subjected to filtering to filter out the dark current by the correlated dual sample-hold circuit 20, and then, the signals are provided through the pre-amplifier 40 to the video processor and encoder 50 for synthesizing the signals R3, G3 and B3 to form composite signals and to output them in the form of composite video signals Vo.

The video signals Vf synthesized from the R, G and B signals by the pre-amplifier 40 are provided to the control signal converting circuit 80 for selecting one of the ½-pitch interlacing and the ⅓-pitch interlacing methods. Then the circuit 80 generates control signals C2 or C3.

For example, according to the levels of frequency band or the level of gain, or in the presence of a significant difference between one of the R, G and B signals and the other signals, the control signal converting circuit 80 generates control signals C2 or C3 for controlling the correlated dual sample-hold circuit 20, the composite ⅔-pitch delaying and ⅓-pitch delaying circuit 60, the composite ⅓-pitch delaying and bypassing circuit 70 and the video processor and encoder 50 to select one of the ⅓-pitch interlacing and the ½-pitch interlacing methods, before performing the operation.

The control signal C3 controls the luminance signals Y in the video processor and encoder 50, so that the luminance signals Y become 0.3R+0.59G+0.11B in the case of ½-pitch interlacing and the luminance signals Y become 0.33R+0.33G+0.33B in the case of ⅓-pitch interlacing.

According to another embodiment of the present invention, the R signals R1 among the output signals from the CCD pickup circuit 10 advantageously can be be bypassed to the first correlated dual sample-hold stage 21, or can be delayed by ⅓ pitch, and the G signals G1 can be directly provided into the second correlated dual sample-hold stage 22, and the B signals B1 can be delayed by ½ pitch or ⅔ pitch. Further, the downstream circuits for the R, G and B signals can be changed with respect to one another.

According to the present invention as described above, the interlacement method for interpolating pixels comprises the steps of converting R, G and B photo signals to electrical signals, delaying one pair of the signals by ½ pitch and removing dark current from the R, G and B signals by using the correlated dual sample-hold technique, and synthesizing the R, G and B signals to form composite video signals, the delaying step further including the step for selecting and performing one a ⅓-pitch interlacing in accordance with the levels of the frequency and gain, thereby improving the resolution while using the substantially same number of CCD pixels.

What is claimed is:

1. In an interlacement apparatus for interpolating pixels using correlated dual sample-hold processing, said apparatus including a CCD pickup device provided with first, second and third CCD image pickup sensors for R, G and B channels, respectively, and for converting R, G and B photo signals to respective first, second and third electrical signals, a correlated dual sample-hold circuit provided with first, second and third correlated dual sample-hold stages corresponding to said R, G and B channels, respectively, for removing dark current from output said electrical signals from said first, second and third CCD image pickup sensors, a pre-amplifier for low-pass filtering respective first, second and third output electrical signals from said correlated dual sample-hold circuit and amplifying respective gains of said output electrical signals to produce respective first, second and third amplified electrical signals, and a video processor and encoder for carrying out video processing after synthesizing said amplified electrical signals from said pre-amplifier, said apparatus further comprising:
a composite ⅔-pitch delaying and ½-pitch delaying circuit for delaying said electrical signal corresponding to said second pickup stage by a selected one of a ⅔-pitch delay and a ½-pitch delay in order to apply first delayed signals to said second correlated dual sample-hold stage;
a composite ⅓-pitch delaying and bypassing circuit for delaying said electrical signals corresponding to said third pickup stage by a selected on a ⅓-pitch delay and a delay corresponding to bypassing in order to apply second delayed signals to said third correlated dual sample hold stage; and
a control signal converting circuit for generating control signals based on clock signals from a pulse generator in a camera and a video signal corresponding to R, G and B synthesized signals from said pre-amplifier for selecting a desired interlacing delay value.

2. The apparatus according to claim 1, wherein said composite ⅔-pitch delaying and ½-pitch delaying circuit and said composite ⅓-pitch delaying bypassing circuit are exclusively connected to any two of said CCD pickup stages, respectively.

3. An interlacing method in an interlacement apparatus for interpolating pixels using correlated dual sample-hold processing, said apparatus including a CCD pickup device provided with first, second and third CCD image pickup sensors for R, G and B channels, respectively, for converting R, G and B photo signals to respective first, second and third electrical signals, a correlated dual sample-hold circuit provided with first, second and third correlated dual sample-hold stages corresponding to said R, G and B channels, respectively, for removing dark current from output said electrical signals from said first, second and third CCD image pickup sensors, a pre-amplifier for low-pass filtering respective first, second and third output electrical signals from said correlated dual sample-hold stages and amplifying respective gains of said output electrical signals to produce respective amplified first, second and third electrical signals, and a video processor and encoder for carrying out video processing after synthesizing said amplified electrical signals from said pre-amplifier, said interlacing method comprising the steps of:
generating control signals based on clock signals from a pulse generator and a video signal corresponding to R, G and B synthesized signals from said pre-amplifier for selecting a desired interlacing delay value;
providing a first selected one of said electrical signals to a corresponding one of said correlated dual sample-hold stages;
delaying a second selected one of said electrical signals by a selected one of a ½-pitch delay and a ⅔-pitch delay and providing first delayed signals to a corresponding one of said correlated dual sample-hold stages; and
delaying a third selected one of said electrical signals by a selected one of a ⅓-pitch delay and a pitch delay corresponding to bypassing a means for delaying and providing second delayed signals to a corresponding one of said correlated dual sample-hold stages;
wherein said first delayed signals and said second delayed signals are selectively delayed by one of said ½ pitch delay and said pitch delay corresponding to bypassing, respectively, and said ⅔-pitch delay and said ⅓-pitch delay, respectively, in response to said control signals.

4. The apparatus according to claim 2, wherein said video processor and encoder comprises means, responsive to an output of said control signal converting circuit, for producing a brightness signal equal to 0.3R+0.59G+0.11B when ½-pitch interlacement is selected, and for producing 0.33R+0.33G+0.33B when ⅓-pitch interlacement is selected, wherein said R, G, and B, correspond to said first, second, and third amplified electrical signals, respectively.

* * * * *